W. C. RARIG.
ENGINE PLOW.
APPLICATION FILED JAN. 21, 1913.
1,094,018.
Patented Apr. 21, 1914.
6 SHEETS—SHEET 1.
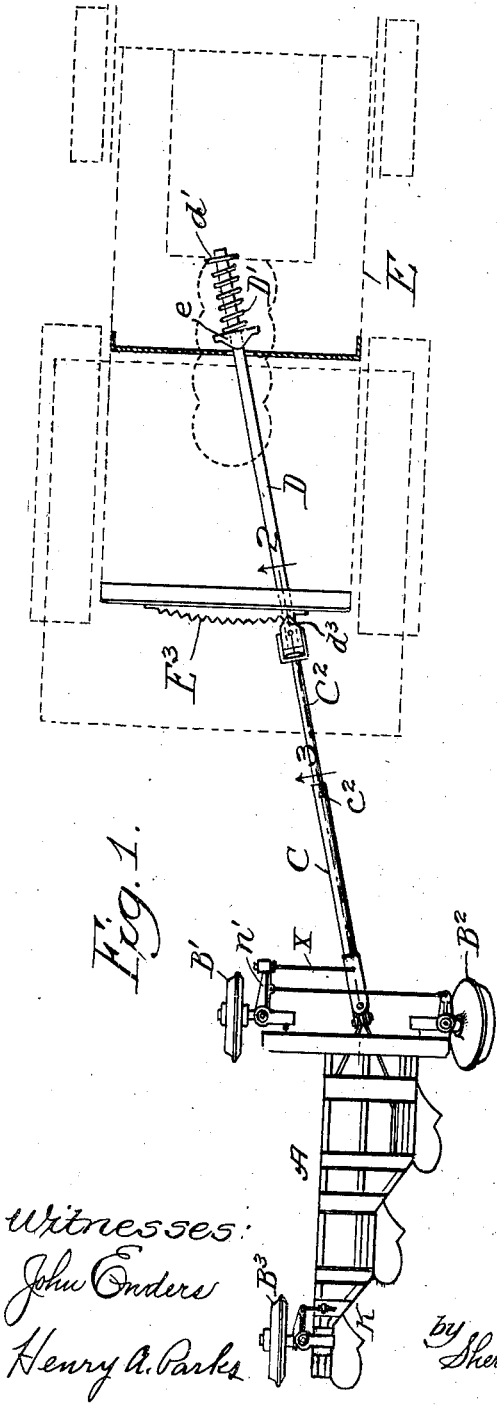
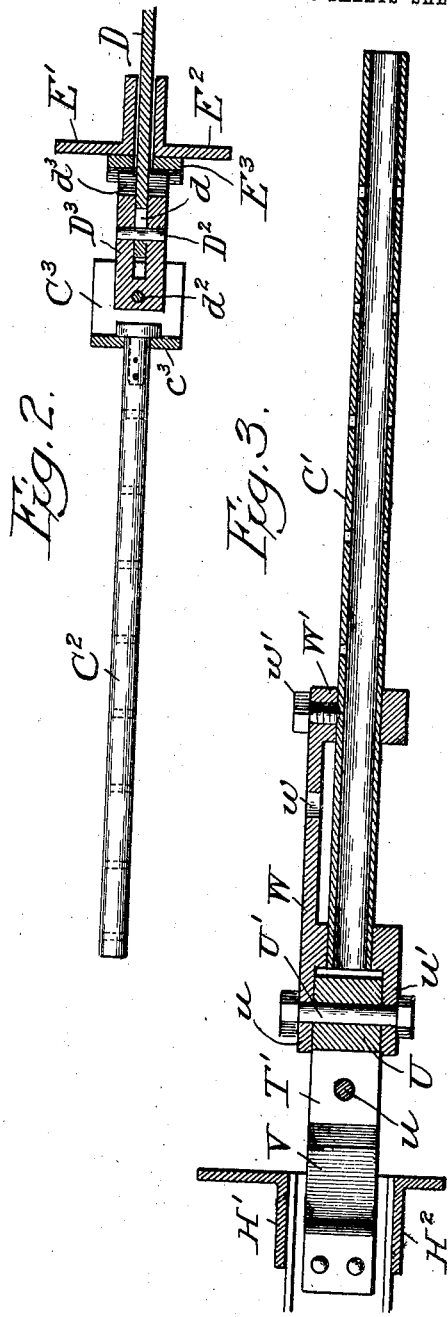
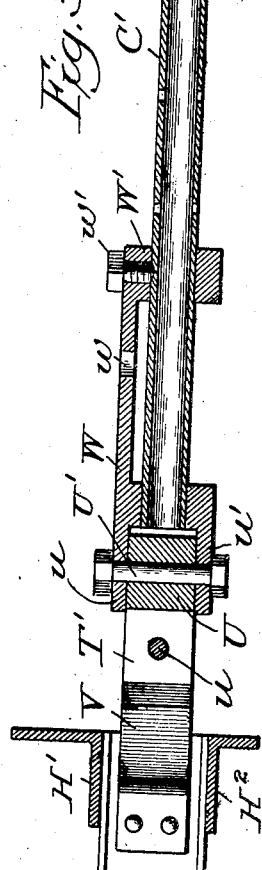
Witnesses:
John Enders
Henry A. Parks
Inventor:
Welden C. Rarig,
by Sheridan Wilkinson, Scott & Richmond
Attys.

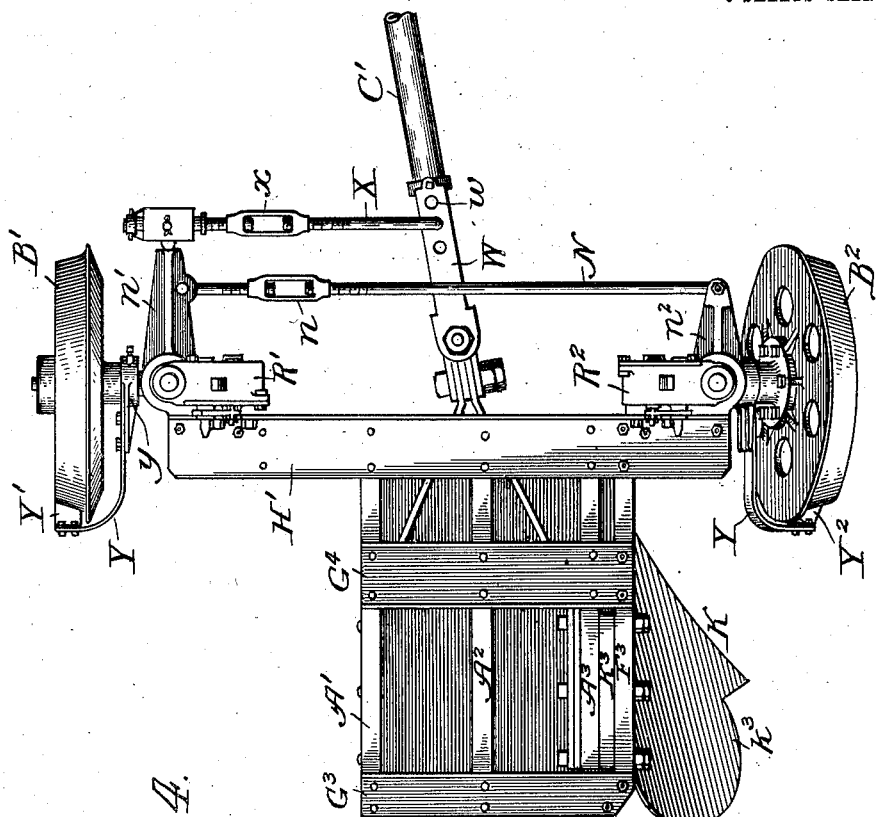

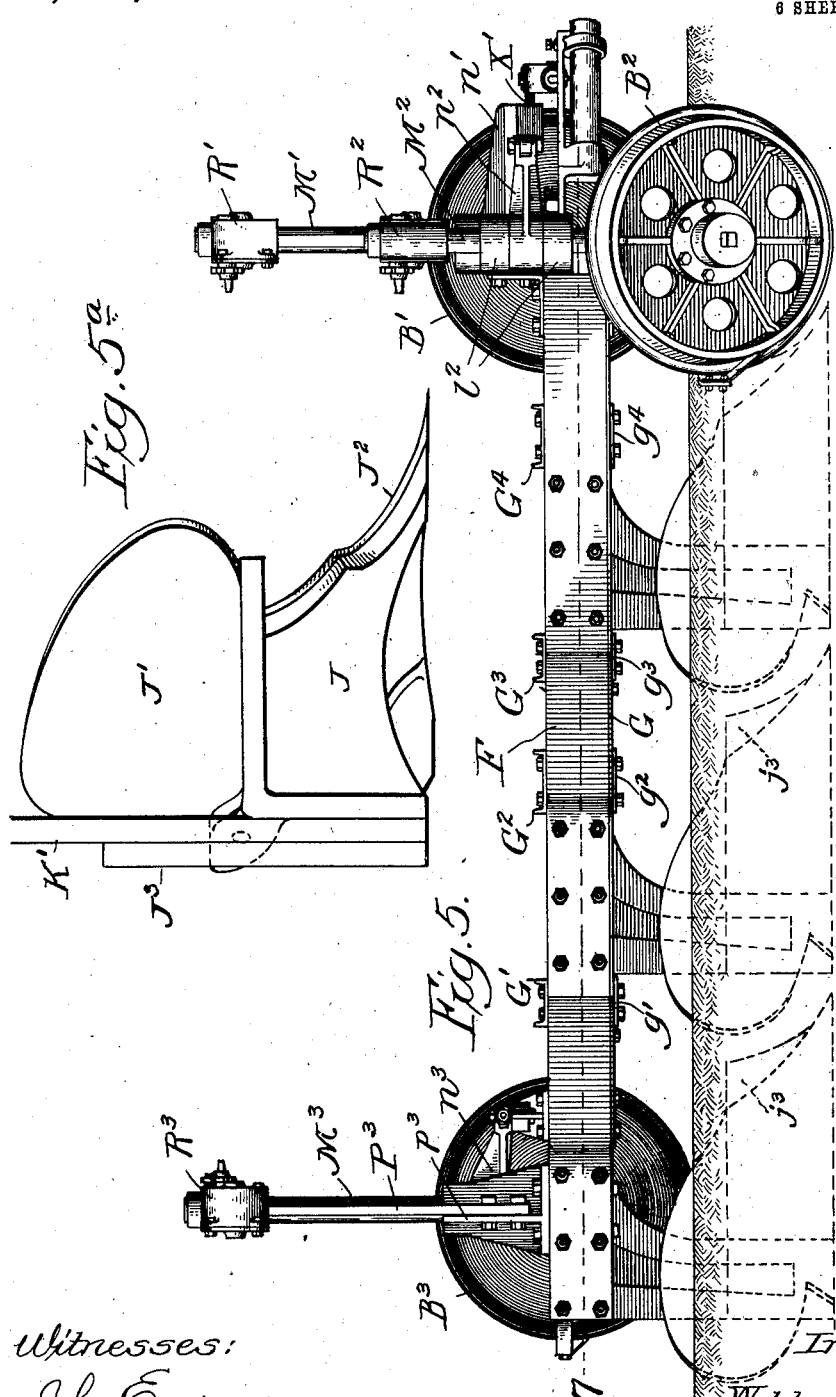

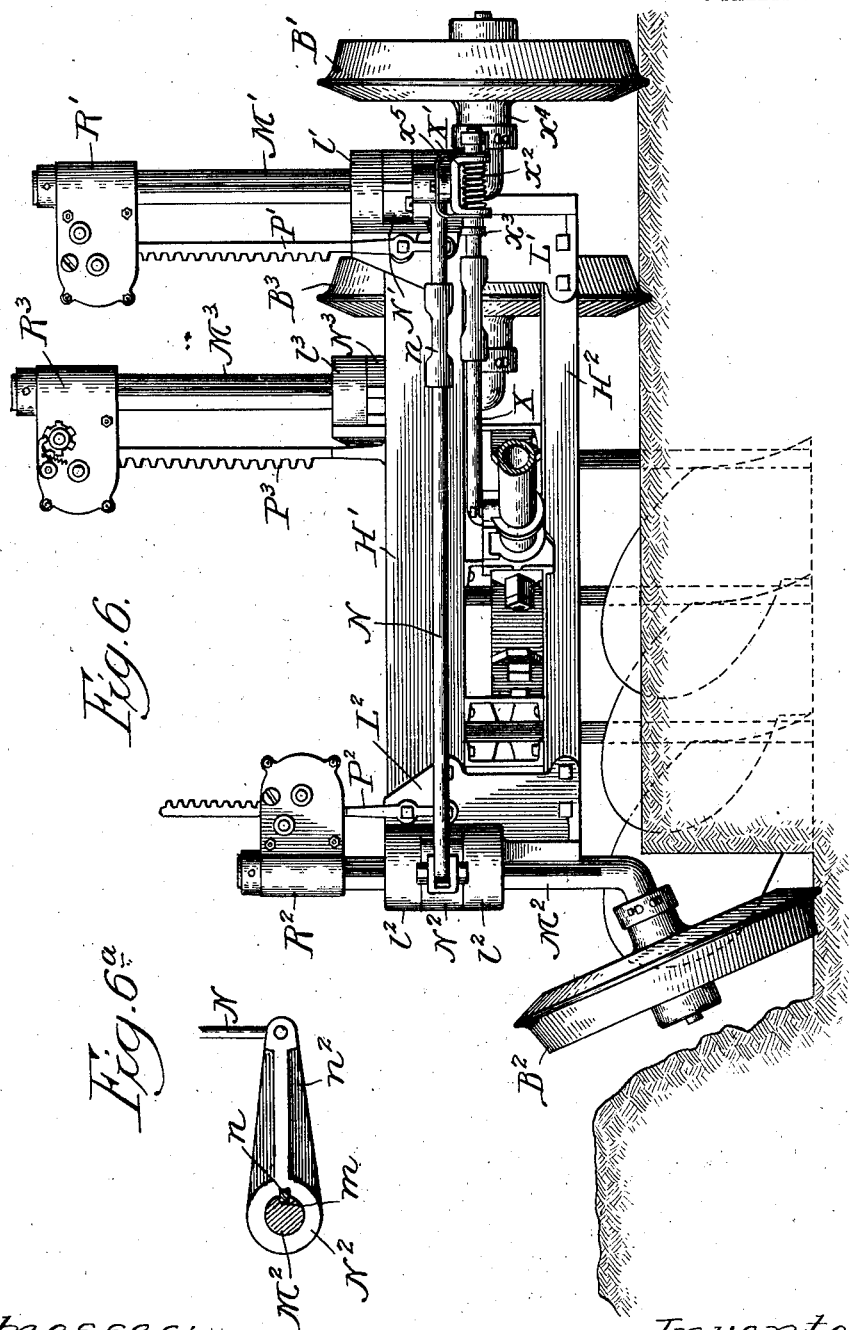

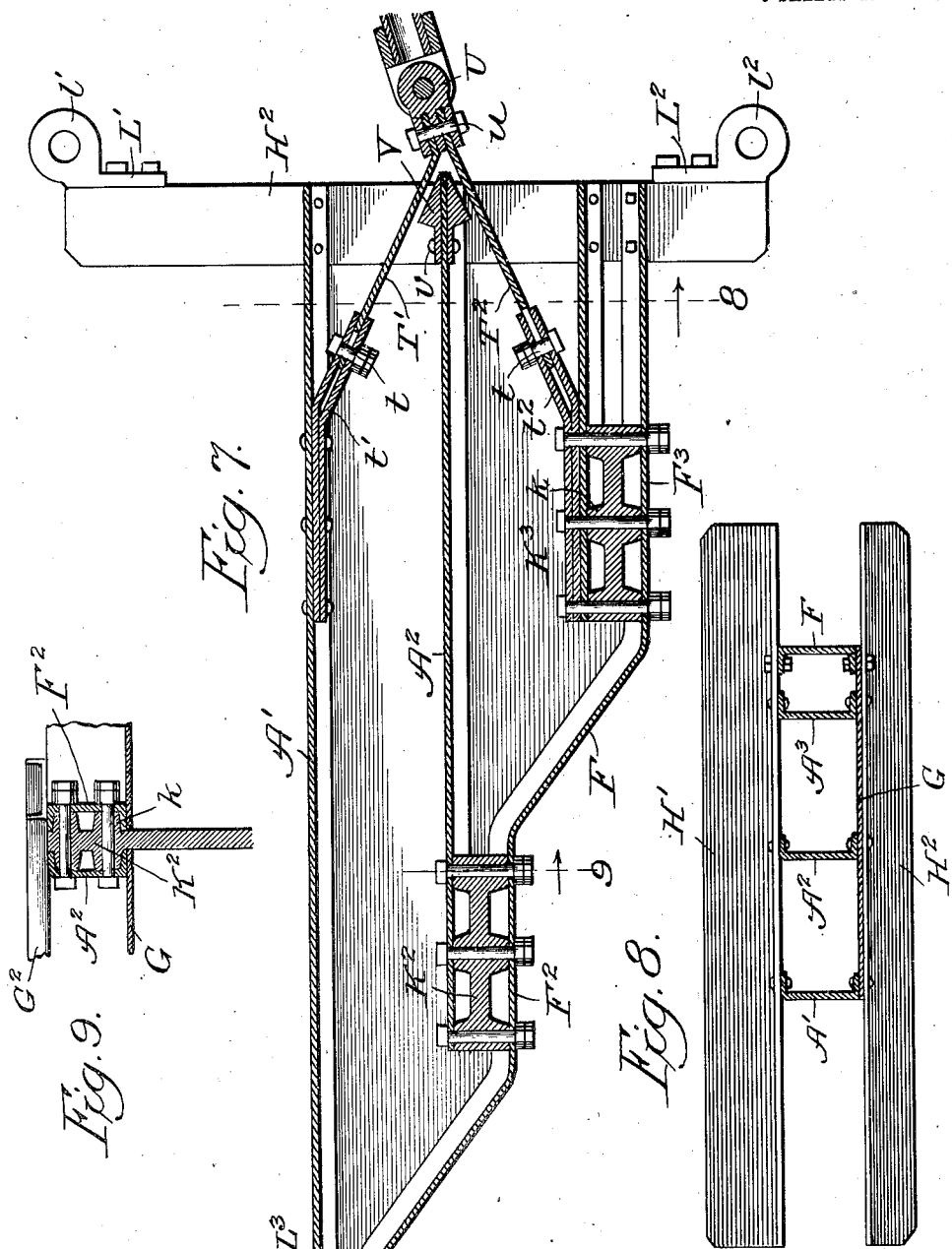

W. C. RARIG.
ENGINE PLOW.
APPLICATION FILED JAN. 21, 1913.
1,094,018.
Patented Apr. 21, 1914.
6 SHEETS—SHEET 6.
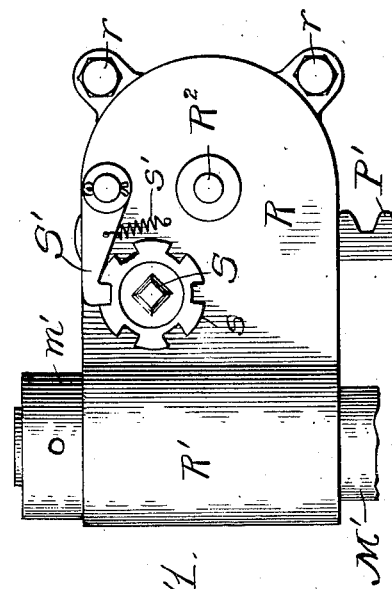
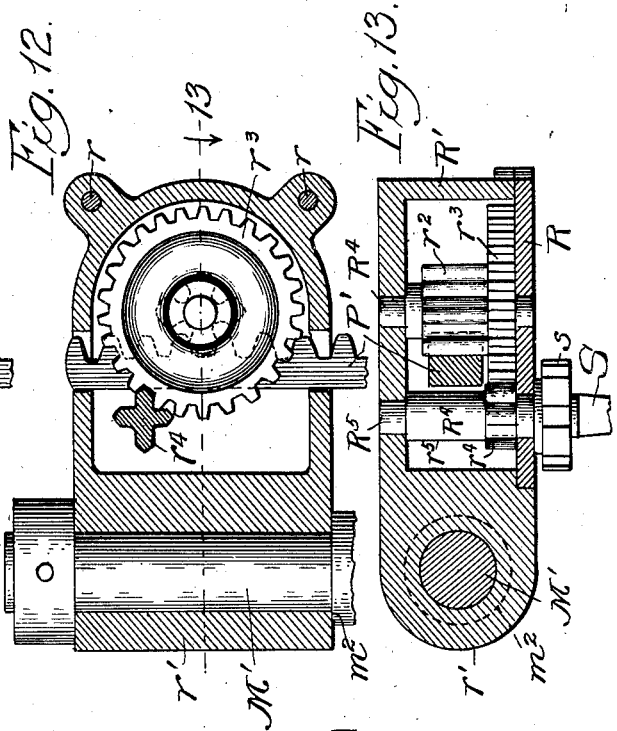
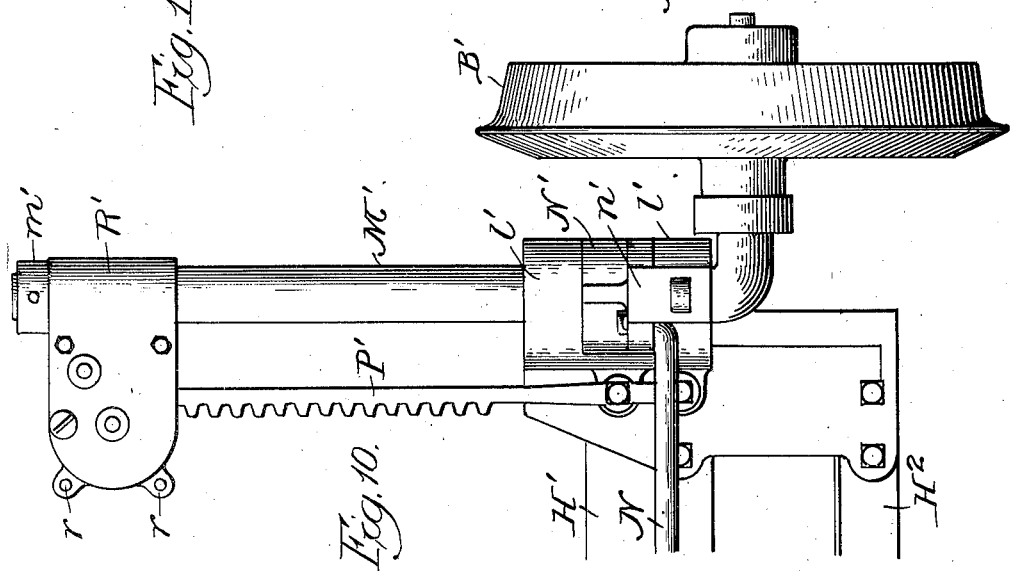
Witnesses:
John Endere
Henry A. Parker
Inventor:
Welden C. Rarig,
by Sheridan, Wilkinson, Scott & Richmond
Attys.

UNITED STATES PATENT OFFICE.

WELDEN C. RARIG, OF TAFT, TEXAS.

ENGINE-PLOW.

1,094,018.　　　　　　Specification of Letters Patent.　　Patented Apr. 21, 1914.

Application filed January 21, 1913. Serial No. 743,252.

*To all whom it may concern:*

Be it known that I, WELDEN C. RARIG, a citizen of the United States, residing at Taft, in the county of St. Patricio and State of Texas, have invented certain new and useful Improvements in Engine-Plows, of which the following is a specification.

My invention relates in general to plows, and more particularly to plows adapted to be drawn by traction engines.

In the operation of engine-drawn plows for plowing hard ground, or ground covered with brush roots or stumps, or for plowing ground to an unusual depth, it is impossible to use a gang of plows having a combined furrow equal to the width of the traction engine, owing to the fact that the resistance in plowing under such conditions is greater than the power of the traction engine. In order to avoid driving the engine with one traction wheel on the plowed ground, it is necessary that the plow should follow the engine at one side of its path of movement. This requires such a connection between the engine and plow that the tendency of the plow to longitudinally aline with the engine will be resisted, while at the same time the engine must be so connected with the plow that the draft on the engine will not deflect the engine from a straight course. It is further desirable that the connections between the engine and plow should be so flexible that any slight variations in the direction of the engine will not produce a corresponding variation in the path of the plow.

One of the objects of my invention is to provide an engine plow in which the draft will be applied at the longitudinal center of the engine so as not to interfere with the engine moving in a straight course, and in which the connections between the engine and plow will be sufficiently flexible to prevent the communication to the plow of variations in the direction of the engine,—due, for instance, to unevenness of the ground or encountering of objects—the connections however between the engine and plow being of such a character that the tendency of the plow to longitudinally aline with the engine will automatically maintain the plow in its path at one side of the path of the engine.

In the operation of engine plows it is frequently necessary to back them, for instance, when stumps or other obstructions are encountered which stall the engine and thereby necessitate it backing up to disengage the plow from the obstruction. Inasmuch as the plow must follow the engine at one side of the path of the engine, the backing of the engine tends to swing the plow to a position at right angle to its normal path, thereby frequently breaking the draw-bar and also damaging the plow by the engine backing onto it.

A further object of my invention is to provide connections between the engine and the plow drawn thereby, of such a character that when the engine is backed the tendency of the plow to swing transversely to its normal path will be automatically overcome and the plow will be moved backward in its normal path.

A still further object of my invention is to provide an improved plow particularly adapted to be drawn by a traction engine, which will be strong in construction, durable in use, and efficient in operation.

My invention will be more fully disclosed hereinafter with reference to the accompanying drawings, in which the same is illustrated as embodied in a convenient and practical form, and in which—

Figure 1 is a plan view of my improved plow and the traction engine by which it is drawn, the latter being principally shown diagrammatically; Fig. 2, an enlarged detail sectional view on line 2, Fig. 1, showing the connection between the engine draft bar and the hitch rod of the plow; Fig. 3, an enlarged sectional view on line 3, Fig. 1, showing the draw tube and its associated parts; Fig. 4, a plan view of the plow; Fig. 5, a side elevation; Fig. 5ª, a detail elevational view looking from the rear, showing one of the plow bodies and its component parts; Fig. 6, a front elevation; Fig. 6ª, a detail section through one of the axles showing its non-rotative engagement with its steering knuckle; Fig. 7, a horizontal section on line 7, Fig. 5, through the supporting frame; Fig. 8, a sectional view of the plow frame on line 8, Fig. 7; Fig. 9, a detail sectional view on line 9, Fig. 7; Fig. 10, an elevational view of one of the front axles, showing the means for relatively raising and lowering the wheel and the plow frame; Fig. 11, an enlarged elevational view of the gear casing for relatively adjusting the wheel and plow frame looking from the rear in Fig. 10; Fig. 12, a vertical central section through the gear box; and Fig. 13, a horizontal section on line 13, Fig. 12.

The same reference characters are used to designate the same parts in the several figures of the drawings.

Referring to Fig. 1, A designates the plow supported upon front wheels B' and B² and rear wheel B³, and connected by a draw rod C with a draw-bar D of the traction engine E. The draw-bar D is flexibly connected to the traction engine at its longitudinal center at a point transversely in advance of the main axle, so that the draft will be imposed upon the engine at its longitudinal center and at a point in a transverse plane near the center of the engine, so that any variations in the direction of the engine will not be communicated to the plow, but will merely cause the draw-bar D to swing with respect to the engine, such swinging motion having an extent, if necessary, limited only by the rear outer corners of the engine frame. In order that sudden strains upon the means which connect the engine with the plow may be avoided, the draw-bar is yieldingly connected to the engine in any suitable manner, as by means of a spring D' surrounding the end of the draw-bar and interposed between a pin d' and a rocking bearing e carried by the engine frame, so that the pull is exerted through the cushioning spring D', and danger of breaking the connections through the sudden stopping of the plow, or through its encountering obstructions, is minimized. It will be observed by reference to Fig. 1 that the bearing e comprises a vertical rib which rests against the adjacent vertical surface of the transverse angle bars of the engine frame so as to accommodate its position to any lateral swinging of the draw-bar relatively to the engine.

As shown in Fig. 2, the draw-bar D passes between and is guided by the horizontal angle bars E' and E² forming the rear of the engine frame. The end of the draw-bar D which projects to the rear of the engine frame is provided with a slot $d$ through which extends the coupling pin D² connecting the same with a clevis D³. The front of the clevis is wedge-shaped—as shown at $d^3$—above and below the draw-bar D, and is adapted when the engine is backed to engage within any one of the teeth in the rack bar E³ which is fixed to the angle bars E' and E² of the engine frame. In this manner when an engine is backed a direct thrust is imparted from the engine frame to the clevis D³ and thence to the plow through the connecting rods in a manner which will be more fully hereinafter described.

*Plow frame.*—The plow frame, as will be readily observed by reference to Figs. 4 to 9, comprises three parallel longitudinal channel beams A', A² and A³ of graduated lengths and terminating in different transverse planes.

F indicates a removable longitudinal channel beam bent so as to form longitudinal portions F', F² and F³ lying parallel to and spaced from the rear ends of the fixed channel beams A', A² and A³. Extending transversely across the top flanges of the channel beams A', A² A³ and F are tying beams, also preferably of channel cross section, G', G², G³ and G⁴. Extending transversely across the lower horizontal flanges of the longitudinal channel beams and alining with the top transverse beams are tie plates $g'$, $g^2$, $g^3$ and $g^4$. The transverse top beams and bottom plates are riveted to the horizontal flanges of the main channel beams A', A² and A³ and are bolted to the horizontal flanges of the supplemental longitudinal channel beam F, so that the latter may be removed to permit the removal of any of the plow standards, when necessary, in a manner hereinafter to be described.

G designates a bottom plate also secured to the bottom horizontal flanges of the longitudinal beams—as shown in Fig. 9—such plate serving to add structural strength to the plow frame, and also to form a smooth bottom for the frame so that roots, brush, or other obstructions, will pass under the plow without being entangled with the frame.

The front ends of the longitudinal beams extend between two front transverse angle beams H' and H², as clearly shown in Figs. 6 and 8. The flanges of the beams A' and A³ are riveted to the horizontal flanges of the angle beams H' and H², while the flanges of the beam F are bolted to the horizontal flanges of the angle beams.

K', K² and K³ designate plow standards, the upper ends of which are interposed between the parallel adjacent portions of the respective longitudinal beams A', A² and A³, and the opposing portions F', F² and F³ of the removable longitudinal beam F. The upper ends of the standards are provided with series of lugs $k$ which fit within the top and bottom flanges of the adjacent portions of the channel beams, as clearly shown in Figs. 7 and 9. Bolts extend through the vertical webs of the channel beams and the interposed lugs on the plow standards, thereby rigidly securing the plow standards to the plow frame. In order to insure the rigidity of such connection three vertical pairs of lugs $k$ are preferably provided on each standard between the portions of the channel beams to which it is connected. Secured to the lower ends of the standards, in any suitable manner are plow bodies $k'$, $k^2$ and $k^3$, respectively, which are so staggered as to cut successive furrows as the plow is drawn. The construction of the plow bodies will be readily understood by reference to Figs. 5 and 5ª, in which J designates a frog interposed between the standard and the mold-board J' and plow share J². J³ designates the land-side which is of such a height as to afford a secure connection of the mold-board and frog to the standard and to impart to the plow body the requisite strength to withstand the severe strains to which it is subjected in plowing hard land or land covered with brush roots and stumps. In Fig. 5, it will be seen that the front upper portion of the land-side J³ projects. in front of the mold-board so as to form a colter-knife $j^3$. By forming the colter-knife integral with the land-side, rather than forming the colter-knife separately and extending it to the plow frame for support, less obstruction is afforded to brush and roots.

*Steering mechanism.*—Secured to the oppositely projecting vertical flanges of the front angle beams H' and H² are plates L' and L² having pairs of spaced horizontal lugs $l'$ and $l^2$, respectively, as shown in Figs. 5 and 6. Extending vertically through the spaced pairs of ears $l'$ and $l^2$ are the vertical portions M' and M² of the axles of the front wheels B' and B². Interposed between the spaced ears $l^2$ is a steering knuckle N² through which the vertical portion of the axle M² passes, a vertical keyway $m$ being formed in the axle into which extends a key $n$ carried by the knuckle, as shown in detail in Fig. 6ª. In this manner the axle may be adjusted vertically relatively to the knuckle, but is non-rotatively connected therewith.

N' designates a knuckle interposed between the ears of the pair $l'$ through which extends the vertical portion of the axle M', a key and groove connection being interposed between the knuckle and axle, such as above described in connection with the axle M² and knuckle N².

L³ designates a bracket rigidly secured at the rear of the plow frame—as shown in Fig. 7—having laterally projecting spaced ears $l^3$ between which is located the knuckle N³ through which extends the vertical portion of the rear axle M³ of the rear wheel B³, a groove and key connection being provided between the axle and knuckle.

A steering arm $n^3$ projects from the knuckle N² and is pivotally connected to a screw threaded rod $o^3$—as shown in Fig. 4— which extends through an eye $o$ on a plate O rigidly secured to the top horizontal flanges of the channel beams A' and F. Lock nuts $o'$ and $o^2$ engage the rods $o^3$ on opposite sides of the eye $o$, so that the position of the rear steering wheel B³ may be adjusted. Steering arms $n'$ and $n^2$ project forwardly from the knuckle N' and N², respectively, which are pivotally connected by a rod M, the latter being adjustable in length by means of a turnbuckle $m$ so as to adjust the relative positions of the front wheels B' and B².

*Plow adjusting mechanism.*—Rigidly secured to the brackets L' and L² are vertical rack bars P' and P², respectively. A similar rack bar P³ projects upwardly adjacent the rear axle M³ and is rigidly secured at its lower end to a bracket L⁴ rigidly secured to the plow frame, as shown in Figs. 4 and 5. The rack bars P', P² and P³ extend through gear casings R', R² and R³, respectively, through which also rotatably extend the vertical portions of the axles M', M² and M³, respectively. The gear casings, and gears therein, are all similar in construction and operation and are illustrated in detail in Figs. 10 to 13, inclusive, in which are shown the gear casing and inclosed gears for relatively adjusting the axle M' and the plow frame. R indicates a removable side cover of each gear box which is secured in place by screws $r$ passing through registering lugs on the casing and cover. R⁴ designates a stub shaft journaled at its ends in the casing and cover and having rigid thereon a pinion $r^2$ and a gear wheel $r^3$, the latter meshing with a pinion $r^4$ fixed upon a counter-shaft R⁵ extending through and journaled in the cover R and opposing wall of the casing. The vertical rack bar P extends between the pinion $r^2$ with which it meshes, and a cylindrical bearing $r^5$ on the shaft R⁵, the rack bar being thereby retained in mesh with the pinion $r^2$. The shaft R⁵ has secured thereto a ratchet $s$ on the portion thereof outside of the cover of the gear casing. A pawl S' coöperates with the ratchet $s$ to lock the same, and with it the rack bar P in adjusted positions. $s'$ is a spring for retaining the pawl S in engagement with the ratchet wheel $s$. The end of the shaft R⁵ is squared—as shown at S—so as to be engaged by a wrench for rotating the same.

In order to raise or lower any of the wheels with respect to the plow frame, a wrench is applied to S and the respective shaft R⁵ thereby rotated, which, through the meshed pinion $r^4$ and gear $r^3$, raises or lowers the corresponding rack bar through the engagement therewith of the pinion $r^2$, thereby vertically adjusting such rack bar with respect to the gear casing and coincidently vertically adjusting the corresponding axle with respect to the plow frame so as to raise or lower each wheel if desired. The gear casing is prevented from moving vertically relatively to the axle by means of a shoulder $m^2$ (see Fig. 12) formed by reducing the upper end of the axle which passes through the gear casing, and by a collar $m'$ clamped to the upper end of the axle immediately above the gear casing.

*Draft mechanism.*—Referring more particularly to Figs. 4 and 7, T' and T² designate forwardly converging draw-bar connecting links, the rear ends of which are slotted and extend between the ears of brackets $t'$ and $t^2$, respectively, the latter being rigidly secured to the plow frame, preferably the bracket $t'$, being riveted to the web of the channel beam $A'$, and the bracket $t^2$ being bolted to the web of the beam $A^3$ by the same bolts which pass through such beam, the adjacent portion $F^3$ of the beam F and the interposed head of the plow standard $K^3$. A bolt $t$ extends through registering holes in each of the ears of the brackets $t'$ and $t^2$ and through the slot in the rear ends of the draft links $T'$ and $T^2$, respectively. The forward converging ends of the draft links are pivotally connected by a coupling $u$ with a clevis U. A V-shaped bumper V is secured to the front end of the longitudinal beam $A^2$ intermediate of the horizontal flanges of the transverse front angle bars $H'$ and $H^2$. This bumper lies between the converging ends of the draft links $T'$ and $T^2$ and is adapted to be directly engaged by them when the plow is to be backed. The clevis U is pivotally connected by the vertical coupling $U'$ with spaced horizontal ears $u'$ on a coupling member W (see Fig. 3) the latter having a collar $W'$ at its forward end through which extends the tubular member $C'$ of the coupling rod C. A clamp nut $w'$ tightly secures the coupling member W to the coupling tube $C'$. $C^2$ designates a rod in telescoped connection with the coupling tube $C'$ and adjustably connected therewith by means of a pin $c^2$ extending through registering holes in the tube and rod. The forward end of the rod $C^2$ extends through a clevis $C^3$ and is pivotally connected therewith by a head $c^3$ located within the clevis and extending within and secured to the adjacent end of the rod $C^2$. The clevis $C^3$ is pivotally connected by a transverse coupling pin $d^2$ with the clevis $D^3$ of the engine drawbar D. X designates a steering rod, one end of which is connected to the coupling member W by engaging in one of a series of spaced holes $w$, as shown in Fig. 4. The opposite end of the steering rod is pivotally connected to the steering arm $n'$ of the knuckle $N'$ through which extends the axle $M'$ of the front wheel $B'$, such connecting means consisting of a bolt $x'$ secured to the outer end of the arm $n'$ and connected to a yoke $X'$ within which is located a spring $x^2$ surrounding the portion of the steering rod X which passes through such yoke. A collar $x^3$ is rigidly secured to the steering rod X adjacent one side of the yoke, while the end of the steering rod which projects to the other side of the yoke is provided with a nut $x^4$. Any suitable locking means, such for instance as the leaf spring $x^5$ locks the nut $x^4$ against rotation. $Y'$, $Y^2$ and $Y^3$ designate scrapers engaging the peripheries of the respective wheels $B'$, $B^2$ and $B^3$, each of such scrapers being supported by a resilient bracket Y fixed to a collar $y$ secured to the axle of the corresponding wheel.

*Operation.*—The plow bodies are adjusted so as to cut furrows of the desired depth by means of adjusting the wheels relatively to the supporting frame, this being done by applying a wrench to the shafts of the gears in the respective gear boxes, thereby vertically adjusting the rack bars and with them the vertical portions of the axles. The position of the rear steering wheel is adjusted by means of the screw threaded rod $o^3$, so that its inclination will be such as to guide the plow in the desired direction with respect to the path of the engine. The rod N is also adjusted by means of the turnbuckle $n$ so that the front wheels will be given the desired relative inclination to retain the front end of the plow in the desired position with respect to the furrow. The steering rod X is also adjusted so that the front wheels will be given the desired inclination through the connection of the steering rod with the draft members. The movement of the engine is imparted to the plow through the draft bar D and telescoped members of the connecting rod C. The draft links $T'$ and $T^2$ are drawn forwardly with respect to the brackets to which they are connected until the play due to the slots at their inner ends through which the connecting bolts pass is taken up. Any tendency of the plow to move from its position at one side of the path of the engine,—as shown in Fig. 1—to a position in direct alinement with the engine, causes the steering rod X to be drawn toward the furrow, thereby inclining the front wheels in a direction to return the plow to its proper path at one side of the path of the engine. Consequently the plow is automatically kept in proper alinement with the engine, so as to turn over the unplowed ground adjacent the furrow, and so as to permit the entire width of the traction engine to overlie unplowed ground. Any variations of the engine from its normal path—due, for instance, to unevenness of the ground—does not affect the position of the plow, but merely causes the draft connections to oscillate relatively to the engine. When it is desired to back the plow, which not unfrequently occurs when the ground is covered with brush, the engine is reversed, which causes the segmental rack bar E thereon to engage with the clevis $D^3$ and thereby exert a rearward thrust on the connecting rod C and through it upon the draft links $T'$ and $T^2$, causing the latter to move rearwardly through their slotted connections with the brackets until the converging ends of the draft links abut against the bumper V. A direct thrust is thereby exerted from the engine to the plow frame and the plow is moved backwardly. It is obvious that the position of the plow at one side of the engine, and the consequent inclination of the draft bar and connecting rods, would tend to swing the front end of the plow toward the furrow and the rear end of the plow away from the furrow, so that the plow would twist to a transverse position and thereby tend to break the connections with the engine, and if the engine is not stopped sufficiently soon to endanger the plow by reason of the engine backing into it. This action is avoided owing to the fact that the backward movement of the draft links T' and T² and the coincident backward movement of the draft member W swings the steering rod X toward the rear, and thereby oscillates the steering arm n' toward the furrow. This action inclines the rear peripheries of the front wheels away from the furrow so that the front end of the plow will be directed in its backward movement away from the furrow and the plow prevented from twisting transversely across the path of the engine.

From the foregoing description it will be observed that I have invented an improved engine plow which will be automatically retained in the desired position at one side of the path of the engine without interfering with the desirable flexibility of the connection between the plow and the engine. It will be further observed that in my invention the engine of the plow may be backed without danger of injury to the plow owing to the fact that the tendency of the plow to swing transversely of the path of the engine serves to automatically maintain the plow in its normal longitudinal alinement. It is further evident that in my improved engine plow the depth of the furrow may be readily adjusted, and the plow bodies elevated above the ground when it is desired to transport the same from one place of use to another. It will also be evident that any of the wheels may be lifted relatively to the plow frame to disengage such wheel from an obstruction. It will be further observed that the resilient connection between the engine draw-bar and the engine minimizes the danger of breakage when the plow encounters an obstruction, and that the yielding connection between the steering rod and front wheels will cushion any sudden twisting of the wheels due to encountering an object, thereby avoiding the danger of breaking the steering mechanism. It will further be seen that any one of the plow standards may be readily removed when necessary by merely removing the longitudinal bent channel beam from the rest of the plow frame which can readily be done by merely removing the bolts which connect the same to the other members of the frame, thereby permitting the ready disengagement of the plow standards.

Although I have herein illustrated and described my invention as embodied in a grub plow particularly adapted for plowing land covered with brush roots and stumps, yet it will be understood that my invention is adapted for use wherever conditions are such as to necessitate the use of a gang of plows having a combined width less than the width of the traction engine. Certain portions of my invention, such for instance as the draft mechanism for yieldingly connecting the engine with the plow and at the same time for affording a direct thrust between the engine and plow to back the latter, are applicable to engine-drawn plows in general and are not restricted in their application to plows which must be drawn at one side of the path of the engine.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

What I claim is:

1. The combination with a traction engine, of a plow adapted to be drawn by the engine, means connecting the plow with the longitudinal center of the engine, and means actuated by the tendency of the plow to aline longitudinally with the engine to maintain the path of the plow at one side of the path of the engine.

2. The combination with a traction engine, of a plow adapted to be drawn by the engine at one side of the path of the engine, means for flexibly connecting the plow with the engine to prevent variations in the direction of the engine being communicated to the plow, and means for exerting a direct backward thrust upon the plow when the engine is backed.

3. The combination with a traction engine, of a plow, means for drawing the plow by the engine in a longitudinal path at one side of the path of the engine, and means actuated by the tendency of the plow to swing transversely to the path of the engine when backed to maintain the plow in its normal longitudinal position relatively to the engine.

4. The combination with a traction engine, of a plow, wheels upon which the plow is supported, steering mechanism connected with the wheels for controlling the direction of the plow, draw-bar mechanism connecting the engine with the plow, and means connecting the draw-bar mechanism with the steering mechanism for automatically inclining the rear peripheries of the steering wheels away from the furrow when the engine backs the plow.

5. The combination with a traction engine, of a plow, wheels upon which the plow is supported, steering mechanism connected with the front wheels for controlling the direction of the plow, draw-bar mechanism connecting the engine with the plow and inclining toward the furrow so as to draw the plow in its forward movement in a path adjacent the furrow, and means connecting the draw-bar mechanism with the steering mechanism for automatically inclining the front peripheries of the wheels toward the furrow when the inclination of the draw-bar to the direction of movement diminishes.

6. The combination with a traction engine, of a plow, wheels upon which the plow is supported, means connecting the front wheels to oscillate them in unison, draw-bar mechanism connecting the engine with the plow and inclining toward the furrow, a steering rod connecting the draw-bar mechanism with the means for oscillating the front wheels, and means for varying the connection of the steering mechanism with the draw-bar mechanism, whereby the path of the plow may be varied with respect to the path of the engine.

7. The combination with a traction engine, of a plow adapted to be drawn by the engine at one side of the path of the engine, a draw-bar pivotally connected to the engine frame at the longitudinal center thereof and forward of the main axle and extending in an inclined direction relatively to the path of the plow, and means connecting said draw-bar with the plow frame.

8. The combination with a traction engine, of a plow adapted to be drawn thereby, draw-bar mechanism connecting the engine and plow, means connecting the draw-bar mechanism with the engine frame to permit a longitudinal yielding thereof when the engine draws the plow, means connecting the draw-bar mechanism with the plow frame to permit a slight longitudinal movement of said mechanism relatively to the plow frame, and means whereby the draw-bar mechanism exerts a direct backward thrust from the engine frame to the plow frame when the engine is backed.

9. The combination with a traction engine, of a plow adapted to be drawn thereby, wheels upon which the plow is supported, steering mechanism connected to the front wheels for controlling the direction of the plow, draw-bar mechanism connecting the engine with the plow, means connecting the draw-bar mechanism with the plow to permit a slight longitudinal movement thereof relatively to the plow, and means actuated by the movement of the draw-bar mechanism relatively to the plow when the plow is backed to operate the steering mechanism to incline the rear peripheries of the front wheels away from the furrow.

10. In a plow adapted to be drawn by a traction engine, the combination with a supporting frame, of draft mechanism comprising inwardly diverging links, means connecting the inner ends of said links with the supporting frame to permit a limited relative longitudinal movement, a block fixed to the frame intermediate of the front converging ends of said links, and a draw-bar pivotally connected to the front converging ends of said links, whereby when said draw-bar is moved toward said frame to back the plow, said links will engage said fixed block and impart a direct backward thrust to said frame.

11. In a plow adapted to be drawn by a traction engine, the combination with a supporting frame comprising a front transverse beam and longitudinal beams secured thereto, of draft mechanism comprising rearwardly diverging links extending between longitudinal bars of said frame, means connecting the inner ends of said links with the longitudinal bars so as to permit a limited relative longitudinal movement, a block fixed to the frame adjacent the front transverse bar and located intermediate of the front converging ends of said links, and a draw-bar pivotally connected to the front converging ends of said links, whereby said draft mechanism transmits a pull exerted on the draw-bar to the frame at the rear of the front thereof while a movement of said draw-bar toward said frame will exert a thrust upon said fixed block.

12. In a plow adapted to be drawn by a traction engine, the combination with a supporting frame, of plow bodies secured to said frame, wheels upon which said frame is mounted, draw-bar mechanism operatively connected to said frame, steering mechanism connecting the wheels with said draw-bar mechanism, and means for adjusting the length of the draw-bar mechanism.

13. In a plow adapted to be drawn by a traction engine, the combination with a supporting frame, of draft mechanism comprising inwardly diverging links, means connecting the inner edge of said links with the supporting frame to permit a limited relative movement, and a draw-bar pivotally connected to the front converging ends of said links, whereby when said draw-bar is moved toward said frame to back the plow, said links will have a limited backward movement longitudinally of the frame and then impart a direct backward thrust to the frame.

14. The combination with a traction engine, of a plow adapted to be drawn by the engine, means for flexibly connecting the plow with the engine to prevent variations in the direction of the engine being communicated to the plow, and means for exerting a direct backward thrust upon the plow when the engine is backed.

15. The combination with a traction engine, of a plow, wheels upon which the plow is supported, steering mechanism connected with the wheels for controlling the direction of the plow, draw-bar mechanism connecting the engine with the plow, and means connecting the draw-bar mechanism with the steering mechanism for automatically maintaining the plow in its predetermined relation to the path of the engine when the engine backs the plow.

16. The combination with a traction engine, of a plow, wheels upon which the plow is supported, steering mechanism connected with the wheels for controlling the direction of the plow, draw-bar mechanism connecting the engine with the plow, means connecting the draw-bar mechanism with the steering mechanism for automatically maintaining the plow in its predetermined relation to the path of the engine when the engine backs the plow, and means for adjusting the length of the draw-bar mechanism to vary the distance between the engine and the plow.

In testimony whereof, I have subscribed my name.

WELDEN C. RARIG.

Witnesses:
GEO. L. WILKINSON,
ANNIE C. COURTENAY.